United States Patent
Fan et al.

(10) Patent No.: US 11,663,993 B2
(45) Date of Patent: May 30, 2023

(54) DISPLAY SYSTEM AND DISPLAY METHOD

(71) Applicant: Qisda Corporation, Taoyuan (TW)

(72) Inventors: Yu-Fu Fan, Taoyuan (TW); Yi-Ming Huang, Taoyuan (TW); Yu-Chun Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/368,916

(22) Filed: Jul. 7, 2021

(65) Prior Publication Data

US 2022/0108668 A1    Apr. 7, 2022

(30) Foreign Application Priority Data

Oct. 7, 2020   (TW) .................... 109134688

(51) Int. Cl.
  *G09G 5/14*     (2006.01)
  *G09G 5/38*     (2006.01)
  *G09G 5/04*     (2006.01)

(52) U.S. Cl.
  CPC ............... *G09G 5/14* (2013.01); *G09G 5/04* (2013.01); *G09G 5/38* (2013.01); *G09G 2320/0686* (2013.01); *G09G 2320/08* (2013.01); *G09G 2320/103* (2013.01)

(58) Field of Classification Search
  CPC ....... G09G 5/14; G09G 5/38; G09G 2320/103
  See application file for complete search history.

(56) References Cited

U.S. PATENT DOCUMENTS

2015/0062164 A1*  3/2015  Kobayashi ............ G06T 11/60
                                                                     345/633
2016/0210769 A1*  7/2016  Suryanarayana ...... G06T 11/60

FOREIGN PATENT DOCUMENTS

CN    107168667 A    9/2017
TW    201005528 A    2/2010

OTHER PUBLICATIONS

Office action of counterpart application by Taiwan IP Office dated Oct. 12, 2021.

* cited by examiner

*Primary Examiner* — Samantha (Yuehan) Wang

(57) ABSTRACT

A display system includes a host and a display. The host executes a first application and a program. The program sets a first display parameter corresponding to the first application. The display receives a signal provided by the host. The signal includes a desktop image. The first application is operated at a first window on the desktop image. The program outputs the first display parameter to the display. The display sets the first window with the first display parameter and displays, and displays the non-first window area of the desktop image with a preset display parameter.

15 Claims, 5 Drawing Sheets

DISPLAY SYSTEM AND DISPLAY METHOD

This application claims the benefit of Taiwan application Serial No. 109134688, filed Oct. 7, 2020, the subject matter of which is incorporated herein by reference.

BACKGROUND OF THE INVENTION

Field of the Invention

The invention relates in general to a display system, a display method and a display, and more particularly to a display system, a display method and a display that are able to simultaneously drive different display parameters for partition display.

Description of the Related Art

The current displays on the market can only use one type of display parameter to display a full-screen picture. That is, using different type of display parameters to display different windows on a single display cannot be achieved currently. Therefore, there is an urgent need for a display system, a display method and a display that are able to provide multiple display parameter settings to match windows of different application software.

SUMMARY OF THE INVENTION

The invention is directed to a display system, a display method and a display, which can solve the problem in the prior art and provide a user-friendly visual experience.

According to one aspect of the present invention, a display system is provided. The display system comprises a host and a display. The host is configured to execute a first application software and a setting program. The setting program is used to set a first display parameter corresponding to the first application software. The display is configured to receive an image signal provided by the host. The image signal includes a desktop image. The first application software is used to operate in a first window on the desktop image. The setting program is used to output the first display parameter to the display. The display is configured to set and display the first window according to the first display parameter, and configured to set and display a non-first-window region of the desktop image according to a preset display parameter.

According to another aspect of the present invention, a display method is provided. The display method comprises the following steps: executing a first application software and a setting program; setting a corresponding first display parameter for the first application software; receiving an image signal that includes a desktop image, wherein the first application software operates in a first window on the desktop image; outputting the first display parameter; setting and displaying the first window according to the first display parameter; and setting and displaying a non-first-window region of the desktop image according to a preset display parameter.

According to another aspect of the present invention, a display that is suitable for connecting with a host is provided. The display comprises a panel, an input interface and a controller. The input interface is configured to receive an image signal provided by the host. The image signal includes a desktop image, and a first application software is used to operate in a first window on the desktop image. The input interface is further configured to receive a first display parameter corresponding to the first application software. The controller is configured to display the desktop image on the panel, wherein the panel is configured to display a region of the first window according to the first display parameter, and configured to display a non-first-window region according to a preset display parameter.

BRIEF DESCRIPTION OF THE DRAWINGS

Common reference numerals are used throughout the drawings and the detailed description to indicate the same elements. The present invention will be more apparent from the following detailed description taken in conjunction with the accompanying drawings.

DETAILED DESCRIPTION OF THE INVENTION

Figure 1:
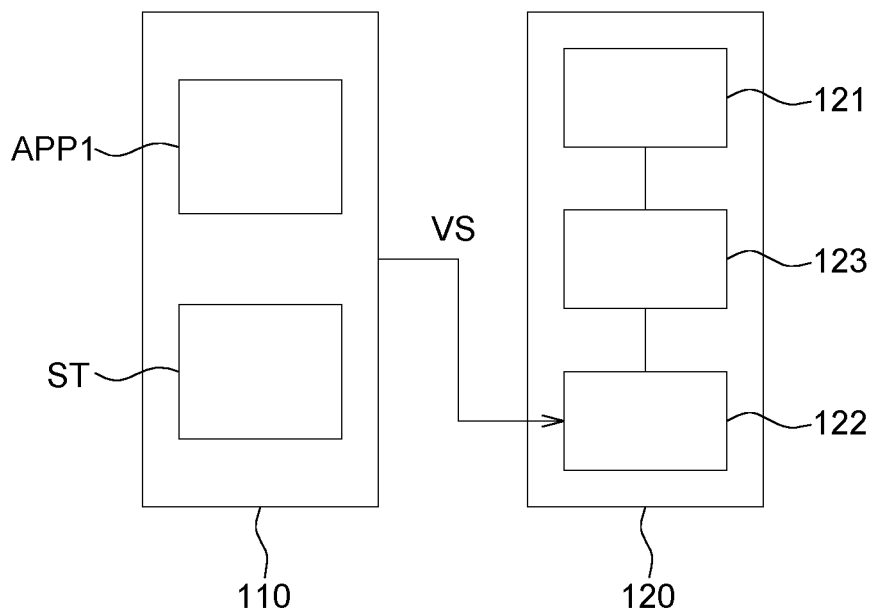
FIGS. 1-2 are schematic diagrams of a display system according to an embodiment.
Figure 2:
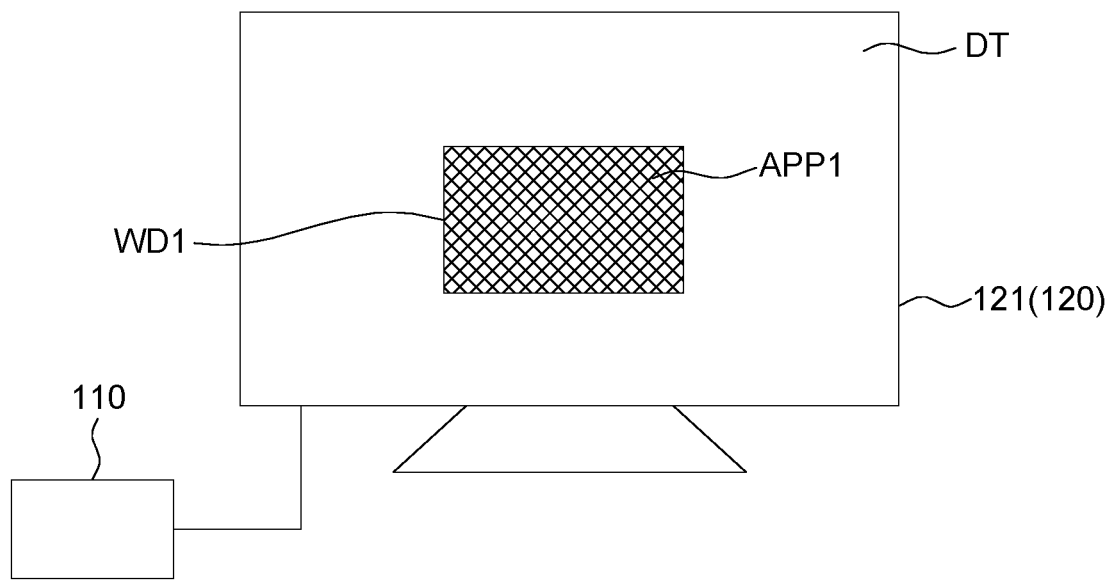

Referring to FIGS. 1 and 2, a display system 100 according to an embodiment is shown therein. Details about the display system 100, a display method applying the same and a display will be described below.

The display system 100 comprises a host 110 and a display 120. The host 110 is, for example, a mobile phone, a desktop image computer, or a notebook computer. The display 120 may comprises a panel 121, an input interface 122 and a controller 123. The input interface 122 can be, for example, a Display Data Channel Command Interface (DDC-CI) connected to and having a protocol with the host 110, and the input interface 122 may receive an image signal VS provided by the host 110. The image signal VS includes a desktop image DT. The controller 123 is, for example, a scaler for processing the image signal VS and displaying the desktop image DT on the panel 121.

The host 110 can be used to execute a first application software APP1 and a setting program ST. The first application software APP1 operates in a first window WD1 on the desktop image DT, and the setting program ST can be displayed in another window. The setting program ST is, for example, a program executable in background for setting a first display parameter corresponding to the first application software APP1. Said display parameter may include Brightness, Contrast, Sharpness, Color Temperature, Hue, Color Saturation, Gamma, and the parameter values related to image quality. The setting program ST briefly shown in Table 1 below provides a menu for an adjustable value of the first display parameter. Uses can set a specific value of the first display parameter for the first application software APP1 via this setting program ST according to their own habits or preferences. For example, users can decrease or increase the continuous values provided by Brightness, Contrast, Sharpness, Color Temperature, Hue, Color Saturation, and Gamma via the left arrow or the right arrow. Alternatively, users can directly click discrete options provided by such as Color Temperature and Gamma.

TABLE 1

| Display Parameter | Adjustable Value |
|---|---|
| Brightness | ← 0~100 → |
| Contrast | ← 0~100 → |
| Sharpness | ← 0~100 → |
| Color Temperature | ← 1800 K~6500 K → |
| | Cool/Normal/Warm |
| Hue | ← 0°~360° → |
| Color Saturation | ← 0~100 → |
| Gamma | 1.8/2.0/2.2/2.4/2.6 |

The host 110 can transmit the first display parameter to the display 120 through the setting program ST by the input interface 122. The input interface 122 receives the first display parameter provided by the host 110. The controller 123 can set a region of the first window WD1 being on the panel 121 according to the first display parameter and set a region of the desktop image DT that is other than the first window WD1, namely a non-first-window region of the desktop image DT, according to a preset display parameter. The panel 121 displays the first window according to the first display parameter and display the non-first-window region of the desktop image DT according to the preset display parameter. The preset display parameter is different from the first display parameter, so the display system 100 can use settings on the host 110 to set different display parameters for different windows of the display 120 to achieve an effect of individualizing each window.

Figure 3:
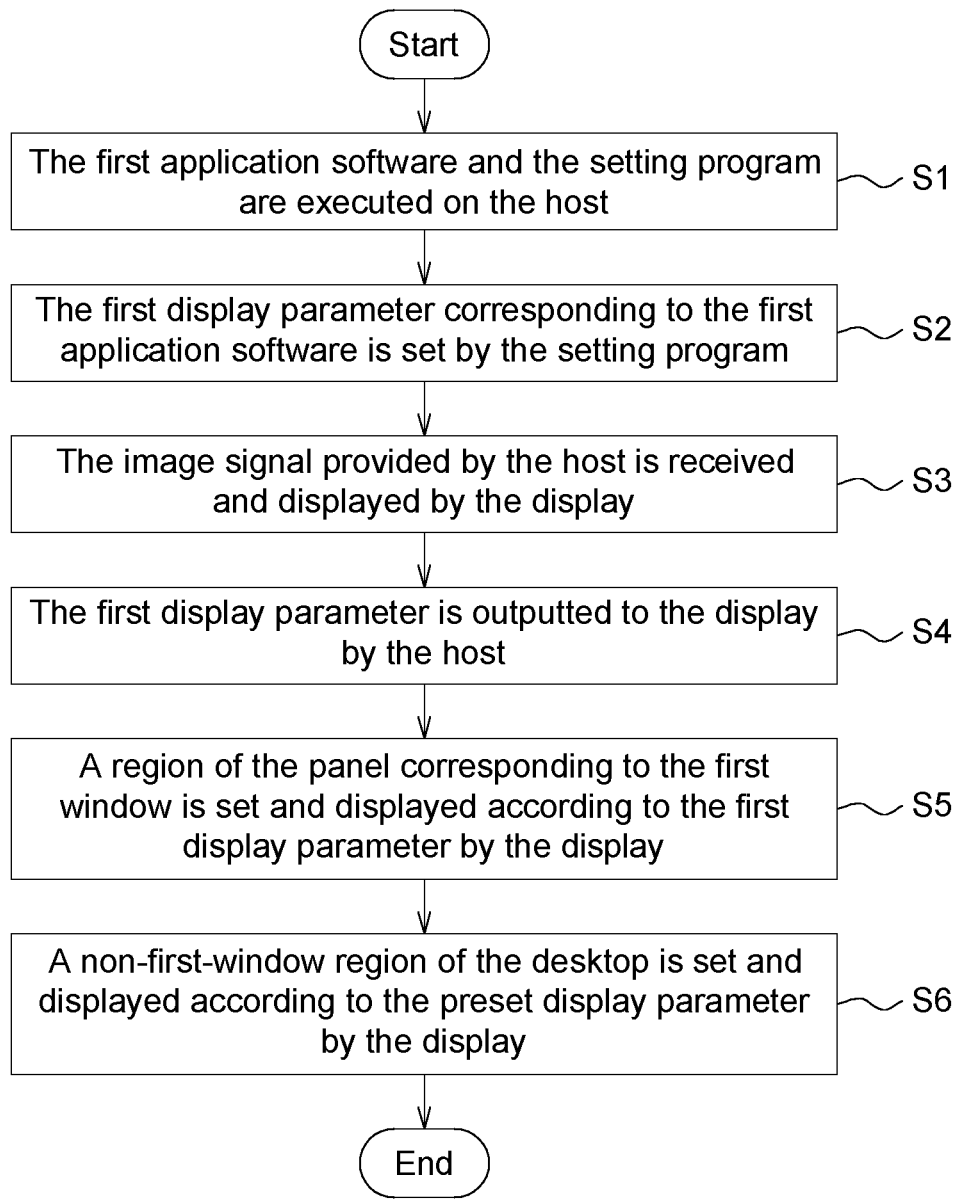
FIG. 3 is a flowchart of a display method according to an embodiment.

Referring to FIG. 3, a flowchart of a display method according to an embodiment is shown. In step S1, the first application software APP1 and the setting program ST are executed on the host 110. Then, in step S2, the first display parameter corresponding to the first application software APP1 is set by the setting program ST. After that, in step S3, the image signal VS provided by the host 110 is received and displayed by the display 120. Then, in step S4, the first display parameter is outputted to the display 120 by the host 110. After that, in step S5, a region of the panel 121 corresponding to the first window WD1 is set and displayed according to the first display parameter by the display 120. Then, in step S6, a region of the desktop image DT that is other than the first window WD1, namely the non-first-window region of the desktop image DT, is set and displayed according to the preset display parameter by the display 120.

The principle regarding the display system 100 and its display method of the present invention will be described in detail here. The setting program ST can detect a first coordinate value of the first window WD1 in the desktop image DT on the host 110 and transmit the first coordinate value to the display 120. The first coordinate value can be understood as a coordinate position of the first window WD1 in the desktop image DT, such as a two-dimensional coordinate like (X, Y). The input interface 122 can receive the first coordinate value corresponding to the first window WD1 from the host 110. The display 120 may use a technology of picture-in-picture (PIP) to display a screen. Specifically, the controller 123 captures an image of the first window WD1 in the image signal VS according to the first coordinate value and uses the technology of picture-in-picture to display the screen. The panel 121 displays the desktop image DT on a main picture and generates a region of the first sub-picture according to the first coordinate value to display the first window WD1. That is, the display 120 sets the said first display parameter for the region of the first sub-screen and displays it, and the display 120 sets the preset display parameter for the region of the main picture except the first sub-screen and displays it. As such, enabling the desktop image DT and the first window Wd1 to have an individual visual effect is achieved.

Figure 4:
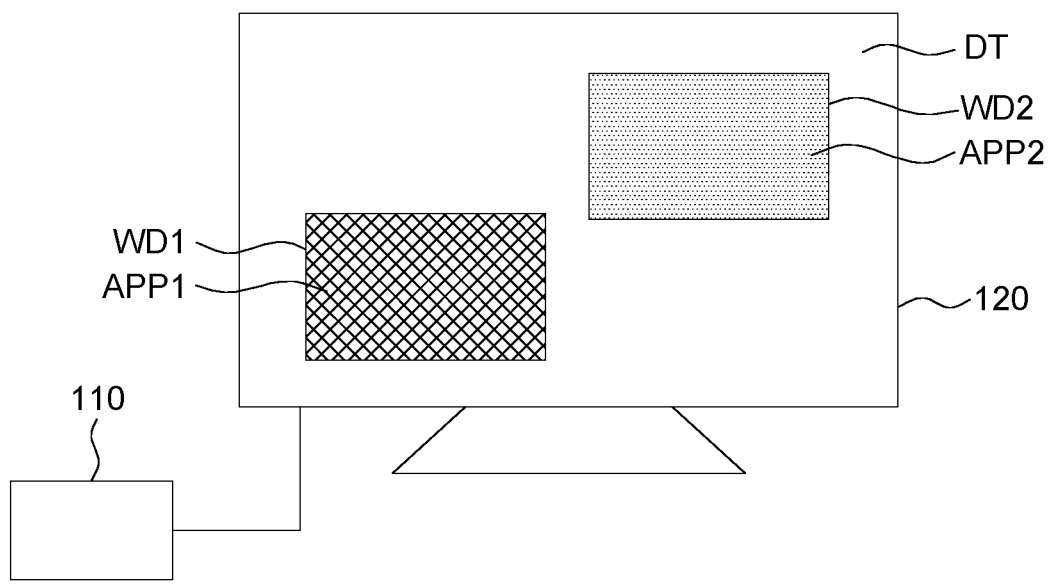
FIG. 4 is a schematic diagram that a display system according to an embodiment executes multiple application software.

Referring to FIG. 4, a schematic diagram of multiple application software executed by the display system 100 according to an embodiment is shown. The host 120 can further execute a second application software APP2. The setting program ST can set a second display parameter corresponding to the second application software APP2. The second application software APP2 operates in a second window WD2 on the desktop image DT. The setting program ST can further detect a second coordinate value of the second window WD2 being on the desktop image DT and can output the first coordinate value, the second display parameter and the second coordinate value to the display 120. The display can display a screen on the display 120 by the said technology of picture-in-picture according to the first coordinate value and the second coordinate value. The first coordinate value and the second coordinate value are respectively used to generate the first sub-picture and a second sub-picture, wherein the desktop image is displayed on a main picture, the first window WD1 is displayed on the first sub-picture, and the second window is displayed on the second sub-picture. That is, the display 120 sets the first display parameter for the region of the first sub-picture to display it; sets the second display parameter for the region of the second sub-picture to display it; and sets the preset display parameter for the main picture except for the first sub-picture and the second sub-picture to displayed it. As such, enabling the first window WD1, the second window WD2 and the desktop image DT to have an individual visual effect is achieved. Since the main picture, the first sub-picture and the second sub-picture are independent with respect to the controller 123 processing pictures, the display parameters can be set independently.

In one embodiment, if a user wants to select the second application software APP2 on the host 110 for operation, that is, the second window WD2 is selected as an active window accordingly. In response to that the second window WD2 is selected as the active window, the display 120 can display the second sub-picture according to the corresponding second display parameter, and display the region of the non-active window of the desktop image DT according to the preset display parameter. As a result, two visual effects can be presented on the screen at the same time, so as to form a visual contrast between the active window and the region other than the active window, thereby highlighting the active window. Or, in another embodiment, in response to that the second window WD2 is selected as an active window, the display 120 can display the second sub-picture according to the corresponding second display parameter; maintain the first sub-picture to be displayed according to the first display parameter; and display a region that is neither the first window nor the active window in the desktop image DT according to the preset display parameter. Therefore, windows of multiple application software can be displayed according to their corresponding display parameters even if they are not selected as an active window, so that multiple visual effects can be simultaneously presented on the screen.

Figure 5:
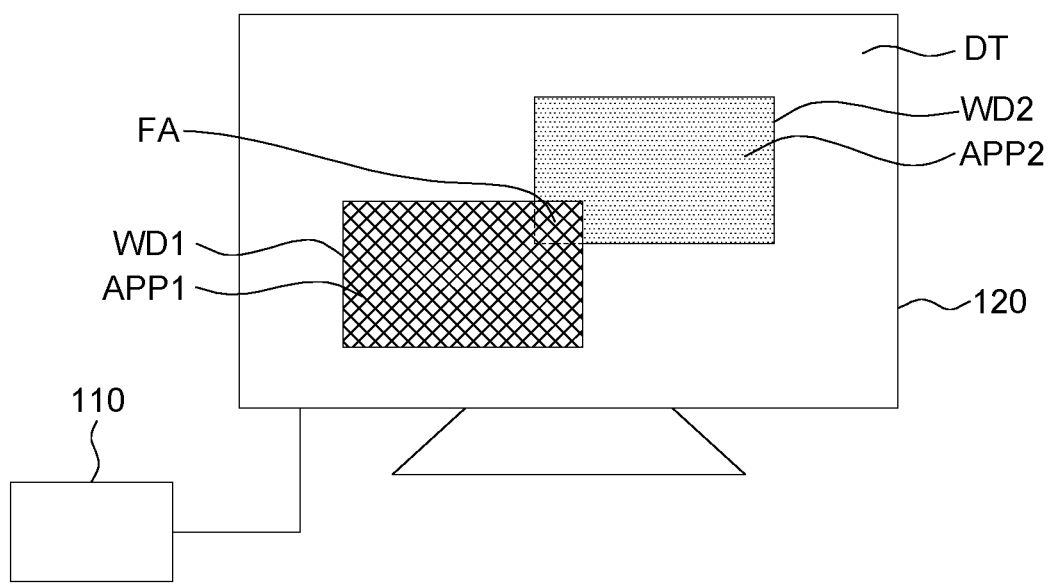
FIG. 5 is a schematic diagram that an overlap of windows exists in a display system according to an embodiment.

Referring to FIG. 5, a schematic diagram that an overlap of windows exists in the display system 100 according to an embodiment is shown. In one embodiment, in response to that a partial overlap FA of windows exists between the first window WD1 and the second window WD2, the setting program ST can be used to determine which of the first window WD1 and the second window WD2 is an upper window. The display 120 can display the partial overlap FA according to the display parameter that corresponds to the upper window. For example, if the setting program ST determines that the first window WD1 is the upper window, the display 120 displays the partial overlap FA according to the first display parameter that corresponds to the first window WD1. It should be understood that this display method can be applied when an overlap exists between more than two application software, and the partial overlap FA is displayed according to the display parameter that corresponds to the upmost window.

In an embodiment, in response to that the host 110 changes the position or size of the first window WD1 so that the first coordinate value of the first window WD1 in the display desktop image DT changes accordingly, the setting program ST can detect the first window A first updated coordinate value of WD1 is transmitted to the display 120, and the display 120 can update the position or size of the first sub-picture according to the first updated coordinate value. Thus, operations such as dragging or zooming corresponding to the first window W1 can be realized, and the first display parameters are automatically set to the changed first window W1 for display.

Figure 6:
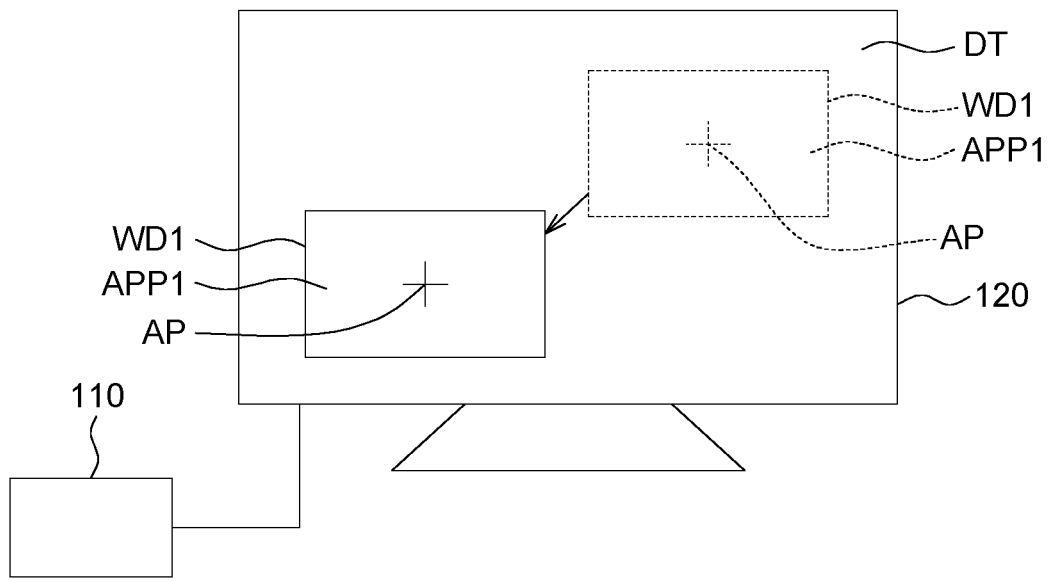
FIG. 6 is a schematic diagram that a display system according to an embodiment displays a symbol.

Referring to FIG. 6, a schematic diagram that the display system 100 according to an embodiment displays an aiming symbol is shown. In an embodiment, the display 120 can generate and display an aiming symbol at a predetermined position of the first sub-picture in an on-screen-display (OSD) manner. The said aiming symbol is, for example, an aim point AP used in a first-person shooter (FPS) game. The aim point AP is displayed in the first window WD1, as shown in FIG. 6. In response to that a position or size of the first window WD1 is changed, the display 120 correspondingly generates an updated position correspondingly and redisplay the aiming symbol at the updated position in the first sub-picture. As shown in FIG. 6, the first application software APP1 is a first-person shooter (FPS) game. The predetermined position of the aim point AP is located at the center of the first window WD1 based on a current position of the first window WD1 (indicated by a dotted line). In response to that a user drags the first window WD1 to the lower left position of the desktop image DT, the display 120 can generate an updated position according to the user's dragging and redisplay the aim point AP in a game screen of the updated first window WD1 (indicated by a solid line). As such, the position of the aim point AP can always be maintained at the center of the first window WD1, and user doesn't have to adjust the aim point AP as each dragging, thereby bringing a better gaming experience.

In an embodiment, the setting program can identify a software feature of the first application software APP1 and determines the first display parameter matching the first application software. The display 120 can apply the determined first display parameter to the corresponding first window WD1. The said software feature is, for example, a word-processing feature, a browser feature, a video-playing feature, an image-displaying feature, a standard color feature, or a game feature, etc. Settings of the first display parameters suitable for different software features are usually different. Therefore, the present invention can determine the most suitable display parameter for different application software, so as to provide a humanized visual experience.

In an embodiment, the display 120 can further comprise an array privacy sheet, and the array privacy sheet is, for example, formed by a polymer-dispersed liquid crystal (PDLC) film. In response to that the setting program ST sets the first application software with a privacy-related feature (for example, the first application software is a browser in an incognito mode), the setting program ST assigns the array privacy sheet to activate an anti-peep function (for example, changing the haze value of the first sub-picture) on an region of the first window WD1 which is a browser in an incognito mode, thereby preventing someone from peeping.

In an embodiment, the setting program ST can read a color space data of the first application software APP1 and assigns the first display parameter to correspond with the color space data. For example, when the first application software APP1 is an image media file, since various image media files have built-in color space data of different color ranges, the setting program ST can read the color space data and assign the first display parameter to set the color space data. As such, the same color space data is applied in the first sub-picture of the first window WD1, so as to truly present the color of the image media file.

Figure 7:
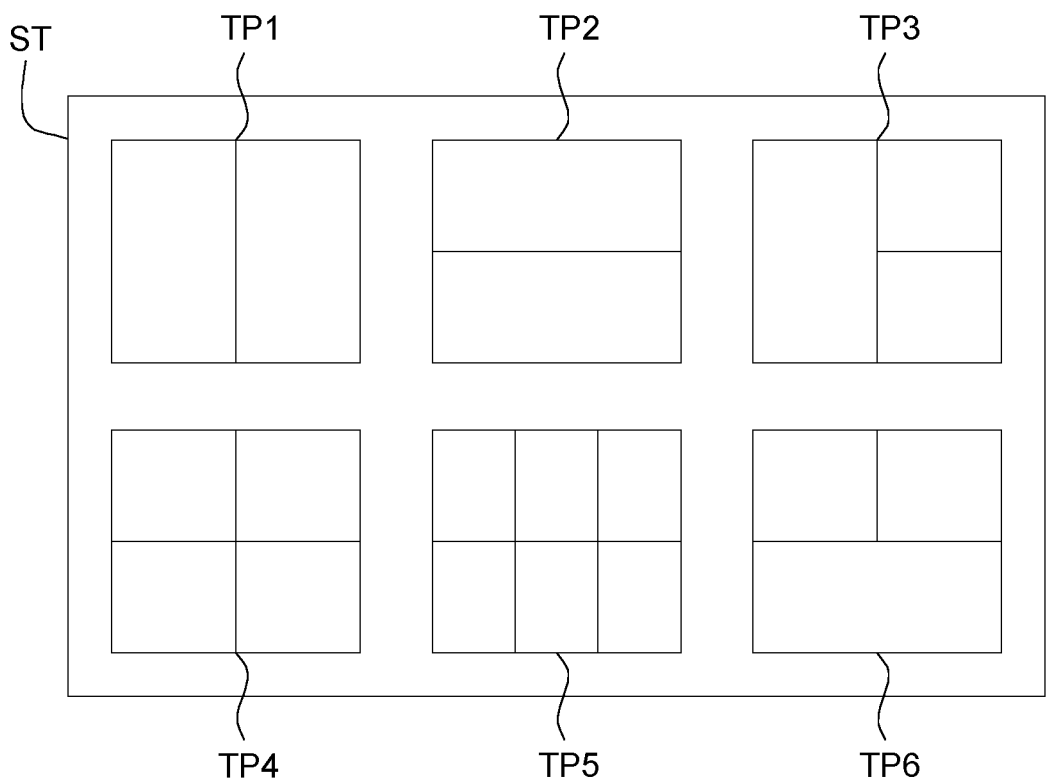
FIG. 7 is a schematic diagram of a menu of a setting program according to an embodiment.

Referring to FIG. 7, a schematic diagram of a menu of the setting program ST according to an embodiment. In an embodiment, one page of the menu of the setting program ST may have templates TP1 to TP6. Take six kinds of template for example to illustrate here, but the present invention does not limit the number of template. Templates TP1 to TP6 correspond to the desktop image DT and provide different options to divide the desktop image DT into multiple blocks, and each block can be preset a specific display parameter. The setting program ST can allow a user to arrange multiple application software to be located in each block respectively based on his/her preference. In response to that the first application software APP1 is dragged to one of the blocks, the one of the blocks corresponds to the first display parameter. The host 110 can adjust a size of the first window WD1 to match with a size of the one of the blocks, and the display 120 displays the first window WD1 according to the first display parameter corresponding to the one of the blocks.

Figure 8:
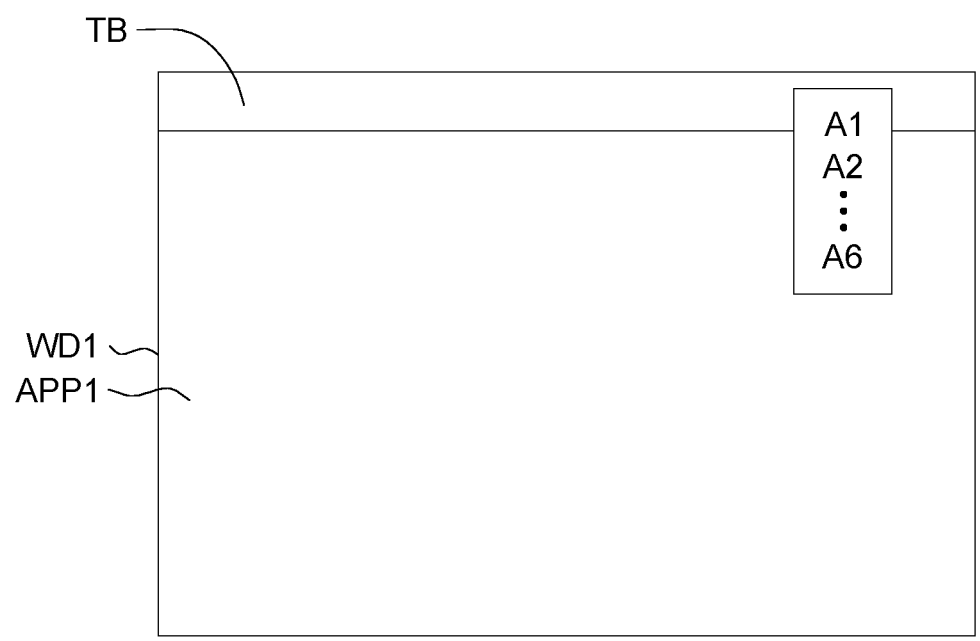
FIG. 8 is a schematic diagram of an interface of a first application software according to an embodiment.

Refer to FIG. 8, a schematic diagram of an interface of the first application software APP1 according to an embodiment. In an embodiment, a toolbar TB of the first window WD1 allows a user to select multiple kinds of preset display mode A1 to A6. For example, the user can click on the toolbar TB with a cursor to select. The said preset display mode may be, for example, a word display mode, a game display mode, a low-blue-light display mode, an audio-visual display mode, a night display mode, or a standard display mode, etc. Each display mode has its own display parameter setting. In response to that a user selects one kind of the preset display mode A1 to A6 from the toolbar TB of the first window WD1, the preset display mode is only presented in the first window WD1. That is to say, selecting the preset display mode to apply it into a single window will only affect the presentation of this single window, but will not affect the presentation of other windows. For example, the first application software APP1 is a game software, and the second application software APP2 is a video software. When a user selects the game display mode from the toolbar TB of the first window WD1 to apply, this game display mode is only presented in the first window WD1, and the second window WD2 of the second application software APP2 will not be presented with the game display mode.

In conclusion, the above-mentioned display system, display method and display of the present invention can set independent display parameter for individual application software, but the region other than the window of application software is still displayed according to the preset display parameter. As such, presenting different kinds of visual effect in different regions in a single full-screen can be achieved, thereby providing a humanized visual experience.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not necessarily be drawn to scale. There may be distinctions between the artistic renditions in the present disclosure and the actual apparatus due to manufacturing processes and tolerances. There may be other embodiments of the present invention which are not specifically illustrated. The specification and the drawings are to be regarded as illustrative rather than restrictive. Modifications may be made to adapt a particular situation, material, composition of matter, method, or process to the objective, spirit and scope of the invention. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A display system, comprising:
a host configured to execute a first application software and a setting program, wherein the setting program is used to set a first display parameter corresponding to the first application software; and
a display configured to receive an image signal provided by the host, wherein the image signal includes a desktop image, and the first application software is used to operate in a first window on the desktop image;
wherein, the setting program is used to output the first display parameter to the display, the display is configured to set and display the first window according to the first display parameter and configured to set and display a non-first-window region of the desktop image according to a preset display parameter;
wherein, the setting program detects a first coordinate value of the first window being on the desktop image and transmits the first coordinate value to the display, the display displays a screen by picture-in-picture, wherein the desktop image is displayed on a main picture, the display generates a first sub-picture by the first coordinate value to display the first window.

2. The display system according to claim 1, wherein in response to that the host changes a position or size of the first window, the setting program detects an updated first coordinate value of the first window and transmit the updated first coordinate value to the display, and the display updates a position or size of the first sub-picture according to the first update coordinate value.

3. The display system according to claim 1, wherein the display generates and displays an aiming symbol at a predetermined position of the first sub-picture in an on-screen-display manner, in response to that a position or size of the first window is changed, the display generates an updated position correspondingly and redisplays the aiming symbol at the updated position in the first sub-picture.

4. The display system according to claim 1, wherein the setting program identifies a software feature of the first application software and determines the first display parameter matching the first application software, the display applies the first display parameter to the corresponding first window.

5. The display system according to claim 1, wherein the display further comprises an array privacy sheet, in response to that the setting program sets the first application software with a privacy-related feature, the setting program assigns the array privacy sheet to activate an anti-peep function on a region of the first window.

6. The display system according to claim 1, wherein the host further executes a second application software, the setting program sets a second display parameter corresponding to the second application software, the second application software operates in a second window on the desktop image, the setting program detects a second coordinate value of the second window being on the desktop image, the setting program outputs the second display parameter and the second coordinate value to the display, the display displays a screen by picture-in-picture according to the first coordinate value and the second coordinate value, wherein the first window is displayed on the first sub-picture, and the second window is displayed on a second sub-picture.

7. The display system according to claim 6, wherein in response that the second window is selected as an active window, the display displays the second sub-picture according to the second display parameter and displays a non-second-window region of the desktop image according to the preset display parameter.

8. The display system according to claim 6, wherein in response that the second window is selected as an active window, the display displays the second sub-picture according to the second display parameter, maintains the first sub-picture to be displayed according to the first display parameter, and displays a region that is neither the first window nor the second window of the desktop image according to the preset display parameter.

9. The display system according to claim 6, wherein in response to that an partial overlap of windows exists between the first window and the second window, the setting program determines which of the first window and the second window is an upper window, and the display displays the partial overlap according to the first display parameter or the second display parameter corresponding to the upper window.

10. The display system according to claim 1, wherein the setting program reads a color space data of the first application software and assigns the first display parameter to correspond with the color space data.

11. The display system according to claim 1, wherein the setting program has a template corresponding to the desktop image and dividing the desktop image image into multiple blocks, the setting program allows a user to set a respective display parameter corresponding to each block, the display applies the respective display parameter to each block, in response to that the first application software is dragged to one of the blocks and the one of the blocks corresponds to the first display parameter, the host adjusts a size of the first window to match with a size of the one of the blocks, so that the first window is displayed according to the first display parameter corresponding to the one of the blocks.

12. The display system according to claim 1, wherein a toolbar of the first window allows a user to select multiple kinds of preset display mode, in response to that the user selects one kind of the preset display mode from the toolbar of the first window, the one of the preset display mode is only presented in the first window.

13. A display system method, comprising:
  executing a first application software and a setting program;
  setting a first display parameter corresponding to the first application software;
  receiving and displaying an image signal provided by the host, wherein the image signal includes a desktop image, and the first application software is used to operate in a first window on the desktop image;
  outputting the first display parameter;
  setting and displaying the first window according to the first display parameter; and
  setting and displaying a non-first-window region of the desktop image according to a preset display parameter;
  wherein the display method further comprises:
  detecting and transmitting a first coordinate value of the first window being on the desktop image;
  displaying a screen by picture-in-picture, wherein the desktop image is displayed on a main picture;
  producing a first sub-picture by the first coordinate value to display the first window;
  producing and displaying an aiming symbol at a predetermined position of the first sub-picture by on-screen display; and
  in response to that a position or size of the first window is changed, producing an updated position correspondingly and redisplaying the aiming symbol at the updated position in the first sub-picture.

14. The display method according to claim 13, further comprising:
  in response to that a position or size of the first window is changed, detecting and transmitting an updated first coordinate value of the first window; and
  updating a position or size of the first sub-picture according to the first update coordinate value.

15. The display method according to claim 13, further comprising:
  executing a second application software;
  setting a second display parameter corresponding to the second application software, wherein the second application software operates in a second window on the desktop image image,
  detecting a second coordinate value of the second window being on the desktop image,
  outputting the second display parameter and the second coordinate value; and
  displaying a screen by picture-in-picture according to the first coordinate value and the second coordinate value, wherein the first window is displayed on the first sub-picture, and the second window is displayed on a second sub-picture.

* * * * *